United States Patent [19]

Baldwin

[11] Patent Number: 5,357,094
[45] Date of Patent: Oct. 18, 1994

[54] TWO-CHANNEL XOR BAR CODE AND OPTICAL READER

[75] Inventor: Dwight G. Baldwin, Austin, Tex.

[73] Assignee: Minnesota Mining and Manufacturing Company, St. Paul, Minn.

[21] Appl. No.: 861,067

[22] Filed: Mar. 31, 1992

Related U.S. Application Data

[63] Continuation of Ser. No. 632,138, Dec. 21, 1990, abandoned.

[51] Int. Cl.$^5$ .................... G06K 19/06; G06K 7/10
[52] U.S. Cl. .................... 235/494; 235/456; 235/462
[58] Field of Search ............ 235/436, 454, 456, 474, 235/487, 494, 462; 371/49.1, 49.2

[56] References Cited

U.S. PATENT DOCUMENTS

| | | | |
|---|---|---|---|
| 3,211,470 | 10/1965 | Wilson | 235/494 |
| 3,316,392 | 4/1967 | Bailey et al. | |
| 3,562,494 | 2/1971 | Schmidt | 235/466 |
| 3,609,306 | 9/1971 | Langley | |
| 3,663,803 | 5/1972 | Mohan et al. | 235/494 |
| 4,237,375 | 12/1980 | Granholm | 235/487 |
| 4,283,622 | 8/1981 | Passer et al. | 235/462 |
| 4,298,792 | 11/1981 | Granholm et al. | 235/375 |
| 4,430,737 | 2/1984 | Beranger et al. | 379/49.2 |
| 4,544,836 | 10/1985 | Galvin et al. | 235/488 |
| 4,605,846 | 8/1986 | Duret et al. | 235/494 |

FOREIGN PATENT DOCUMENTS

| | | |
|---|---|---|
| 84400424.2 | 10/1984 | European Pat. Off. |
| 90117862.4 | 7/1991 | European Pat. Off. |
| 1382345 | 11/1964 | France |
| 2409556 | 6/1979 | France |
| 2494872 | 5/1982 | France |

OTHER PUBLICATIONS

Mansour, IBM Technical Disclosure Bulletin, "Multi-Tiered Condensed Bar Code," vol. 26, No. 2, Jul. 1983, pp. 766–767.

*Primary Examiner*—Davis L. Willis
*Assistant Examiner*—Edward H. Sikorski
*Attorney, Agent, or Firm*—Gary L. Griswold; Walter N. Kirn; Jack V. Musgrove

[57] ABSTRACT

A novel bar code and optical reader for scanning the same. The bar code consists of two parallel channels of marks and spaces representing bit sequences, a given bit in one sequence being associated with a bit in the other sequence, forming successive bit pairs. The data is encoded in the logical exclusive-or combination of the bit pairs. An alternating clock scheme is further used to encode the data, which limits the width of any mark or space to twice the minimum width. The optical reader includes two optical detectors connected to a microprocessor which records the time intervals between mark/space transitions in each channel. These time intervals are used to reconstruct the bit sequences in each channel; the bit sequences may then be correlated and the XOR operation performed, yielding the encoded data.

5 Claims, 6 Drawing Sheets

TWO-CHANNEL XOR BAR CODE AND OPTICAL READER

This is a continuation of application Ser. No. 07/632,138 filed Dec. 21, 1990 now abandoned.

BACKGROUND OF THE INVENTION

1. Field of the Invention

The present invention generally relates to optical scanners or readers for recognizing optical characters and codes, and more particularly to a two-channel bar code wherein the data is encoded in the logical exclusive-or combination of the two channels, and to a device for reading such a code.

2. Description of the Prior Art

Optical readers are used today in a wide variety of applications, such as optical character recognition, electronic facsimile transmission, and bar code scanning. The most common example of the latter type of optical coding is the ubiquitous Universal Product Code (UPC) which has been adopted by the retail industry, and appears on nearly all products available in the retail market. The UPC utilizes a single-channel encoding scheme, i.e., a single series of lines of varying thicknesses which are grouped together at varying intervals. This series of bars or marks is scanned with a single beam, which may traverse the code along its upper, middle or lower portions with the same results.

Standard single-channel bar codes, however, suffer from several disadvantages. The primary disadvantage is the complicated manner in which the data must be encoded to allow for a wide range of scanning conditions. For example, scanning of UPC codes in a retail establishment must accommodate steeply varying scan angles, variable ambient lighting and, when hand-held scanners are used, must further accommodate varying scan speeds. Single-channel bar codes are also usually bidirectional. For these reasons and others, the encoding schemes conventionally used with single-channel bar codes are complicated and, consequently, the optical scanners used to read such marks are relatively expensive to manufacture.

One simple alternative to a single-channel bar code is the prior art two-channel clock/data code, depicted in FIG. 6A. In this code, one channel (the clock channel) consists of uniformly spaced bars each having approximately the same width or thickness (the lower set of bars in FIG. 6A). The second channel (the data channel), is contiguous with the first channel and contains the data encoded in binary form (the upper set of bars in FIG. 6A). The leading edge of the clock channel is used to strobe the data into a register. In the example illustrated, the data cells are phase shifted 90° from the leading edge of the clock cells. When the optical reader detects the leading edge of the next clock cell, it immediately checks the state of the data channel to read either the binary number 1 (e.g., a black mark) or the binary number 0 (e.g., a white space). This code may be read with an optical scanner having either two separate light beams, or having a single, widely dispersed light beam (or light flooding).

The two-channel clock/data code has several advantages over single-channel bar codes, besides its simplicity. For example, the two-channel clock/data code is more dense than a standard single-channel code; this means that the same information may be encrypted into a shorter bar code, which in turn requires a shorter scanning path by the optical reader. Yet, use of a two-channel clock/data code can create new problems. First of all, the object to be scanned must be properly oriented with respect to the two optical detectors in the reader, since the reader has dedicated one of the detectors for sensing the clock channel and the other for sensing the data channel. In other words, if the two-channel clock/data code is turned upside down, the reader will register an error when it attempts to use the data channel for clock information. A related limitation concerns the strict tolerance required in the width of the clock cells. If the code has printing defects which causes either the spaces or the marks to have widths which vary considerably, then the reader will register an error when the location of the next clock edge does not correspond to the anticipated location. Finally, the two-channel clock/data code does not allow self-checking which standard single-channel bar codes employ. It would, therefore, be desirable and advantageous to devise a bar code which is simpler to use than single-channel codes, but which avoids the limitations of the two-channel clock/data code. A relatively inexpensive scanner could then be used to read such a code.

SUMMARY OF THE INVENTION

The foregoing advantages are achieved in a two-channel bar code wherein the data is encoded in the logical exclusive-or (XOR) combination of the two channels. In such a code, neither channel is clearly the clock or data channel, but rather both channels are used for clock timing and data encryption. Each data bit (two channel cell) is distinguished by a transition on either channel (or both), and the data value of that bit is the XOR of both channels. The two-channel XOR bar code preferably limits the maximum width of any space or mark to twice the minimum width, which allows for self-checking and simplifies decoding of the data. This 2:1 width ratio may be encoded by the use of an alternating clock channel scheme. Additional error-checking techniques (such as redundancy) may be used to improve overall performance.

The novel two-channel XOR bar code may be scanned using a two-channel optical reader which, in the preferred embodiment, uses two separate light beams to illuminate the two-channels, respectively. If the bar code is formed using retroreflective marks, then the reader may use less expensive light-emitting diodes (as compared to lasers or laser diodes) for the light sources. The optical reader preferably includes optical collection means for minimizing the detection of undesirable specular reflections from the scanned surface. Finally, the reader must further have logic circuitry and processing means for decoding the two-channel XOR bar codes. A specific embodiment of the optical reader is designed to read two-channel XOR bar codes from a card or other essentially flat substrate.

BRIEF DESCRIPTION OF THE DRAWINGS

The novel features and scope of the invention are set forth in the appended claims. The invention itself, however, will best be understood by reference to the accompanying drawings, wherein:

DESCRIPTION OF THE PRESENTLY PREFERRED EMBODIMENT

Figure 1:
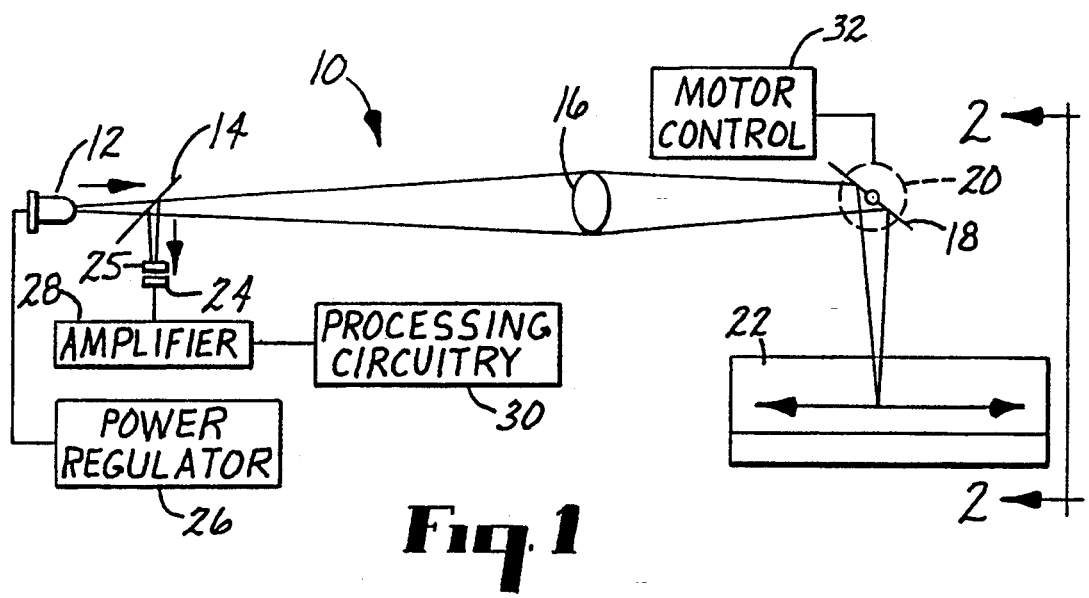
FIG. 1 is a schematic diagram of a generalized optical assembly according to the present invention, depicting in block form the supporting electrical systems.

With reference now to the figures, and in particular with reference to FIG. 1, a generalized embodiment of an optical reader 10 of the present invention is depicted. Optical reader 10 includes an optical subsystem comprising a light source 12, a beam splitter 14, a focussing lens 16, a scanning mirror 18 coupled to a motor 20, a stage area 22 for receiving a reflective object, and an optical detector 24. Optical reader 10 also includes an electrical subsystem comprising a power regulator 26 for light source 12, an amplifier 28, and processing circuitry 30 connected to amplifier 28 for analyzing the received signals. The electrical subsystem further includes a control circuit 32 for motor 20.

In the generalized embodiment of optical reader 10, light source 12, which may be, e.g., a laser, laser diode or light emitting diode (LED), emits light which passes through beam splitter 14, typically a partially silvered mirror. The light is collected and focussed by lens 16 and is reflected off scanning mirror 18 onto stage area 22. The distances between light source 12, lens 16, and stage area 22 are selected to cooperate with the focal length of lens 16, whereby the beam is focussed down to a narrow spot when it reaches the receptive surface of stage area 22. The minimum optical path for a given lens is obtained by placing the light source at a distance of twice the focal length from the lens; however, in order to obtain the desired spot size, light source 12 should be moved even farther from lens 16, As indicated by the two-headed arrow shown on stage area 22, the incident light beam is scanned across stage area 22 by causing mirror 18 to rotate in an oscillating fashion, via motor control 32. Reflections from an object placed on stage area 22, which are directed back toward mirror 18, return along substantially the same path as the incident light beam, through lens 16, and are then reflected by beam splitter 14 toward optical detector 24. A filter 25 may optionally be used to filter out ambient light. The return signal is then augmented by amplifier 28, and processed by circuitry 30 according to the nature of the object being scanned, e.g., optically scannable typeface or bar coding.

The use of the same optical components to direct the return signal along substantially the same path as the incident beam is conventionally known as retrocollection and, while this collection technique is generally preferable, it is not critical to the functioning of optical reader 10. In other words, the reader described herein could be designed to provide a separate path for the return signal heading to optical detector 24, so the foregoing description in this regard should not be construed in a limiting sense.

Figure 2:
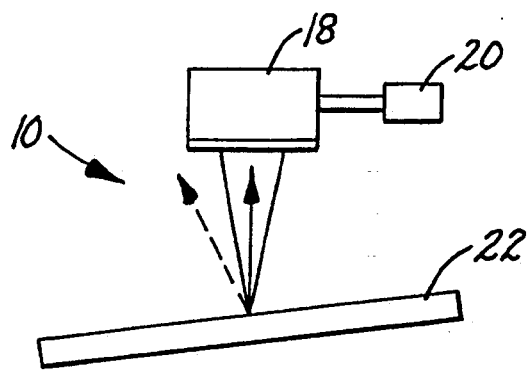
FIG. 2 is a side elevational view of the generalized optical assembly as seen along lines 2—2 of FIG. 1.

One novel aspect of optical reader 10 is the manner in which the optical system is oriented with respect to stage area 22. As shown in FIG. 1, stage area 22 is tilted downward slightly; this is further illustrated in the side elevational view of FIG. 2, to which attention in now directed. This configuration provides the advantage of deflecting specular reflections (indicated by the dashed arrow) away from mirror 18, meaning that such reflections will never be seen by optical detector 24. Instead, only retroreflections or diffuse reflections (indicated by the solid arrow) are gathered by mirror 18 and lens 16. This overcomes the problems associated with interfering specular reflections as discussed above in the Description of the Prior Art.

Figure 3:
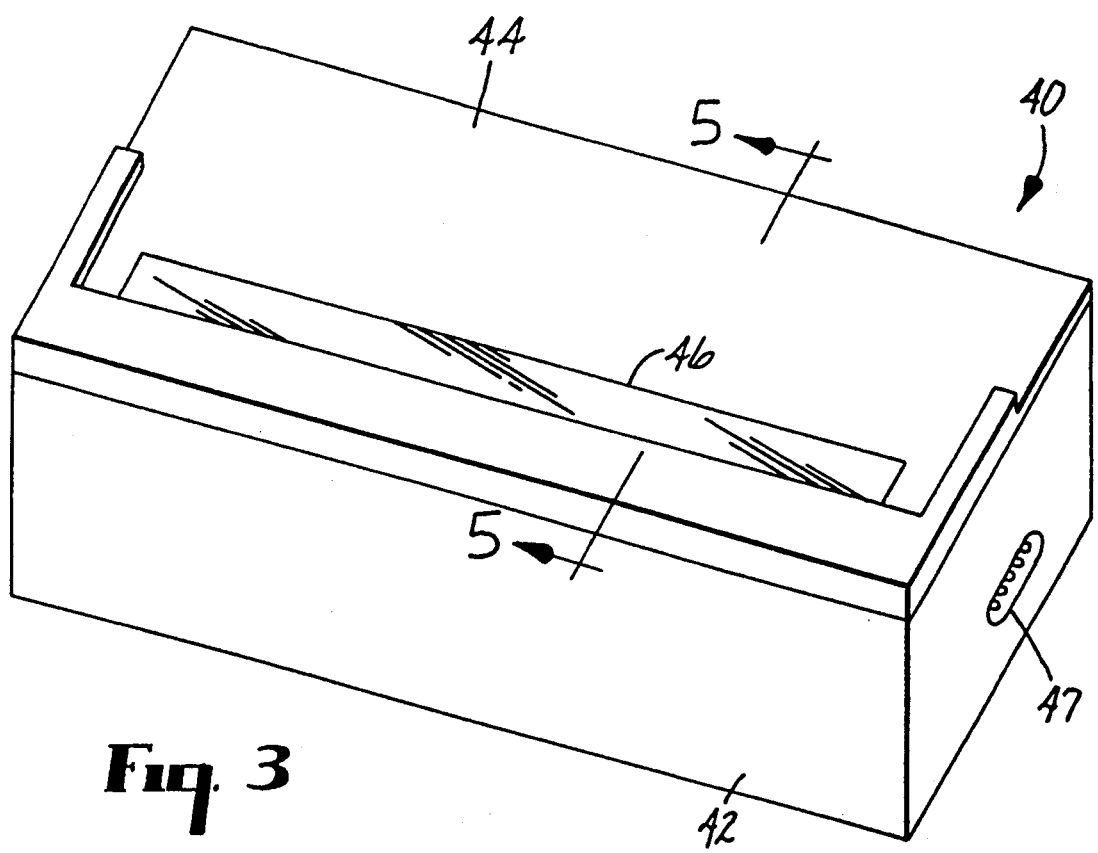
FIG. 3 is a perspective view of the card reader embodiment of the present invention.

Optical reader 10 is particularly suited for reading optical marks from a card or other essentially planar substrate. FIG. 3 illustrates such a card reader embodiment 40, which includes a housing 42 and a cover 44, the cover having a light-transmissive section 46 equivalent to the stage area 22; the light-transmissive section may simply be an opening or slot, but is preferably a window formed of transparent plastic, or another transparent medium such as glass. A connector port 47 may be provided to allow electrical connection to a separate unit which may house part of the electrical system of the present invention, or provide access to peripheral devices. The connection may alternatively be established by means of a wireless remote connection, i.e., radio wave communications.

Figure 4:
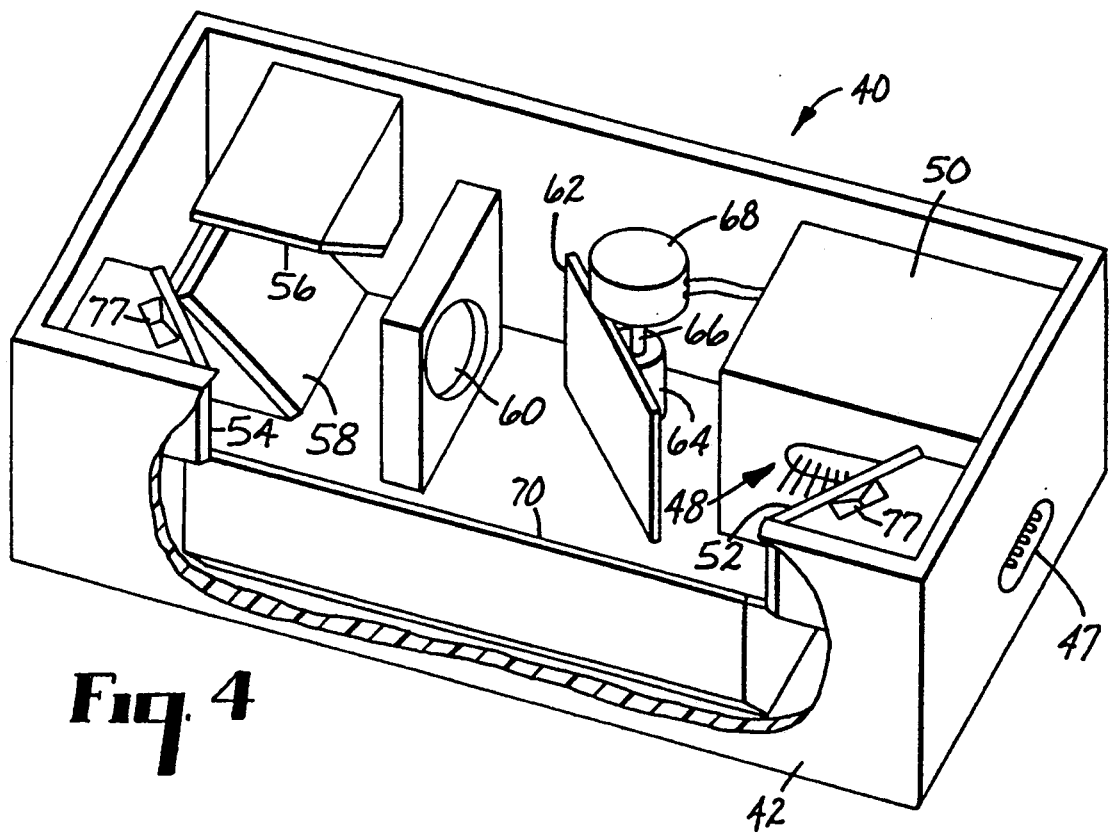
FIG. 4 is a perspective view similar to FIG. 3 but the cover of the card reader has been removed and the front wall is cut out to illustrate the internal optical assembly.

Referring now to FIG. 4, card reader 40 is shown with cover 44 removed so as to expose its internal optical configuration. This configuration is "folded," meaning that several mirrors are used to allow an effectively long optical path to exist within a relatively small volume. The optical path begins with a light source 48 housed in an optical assembly block 50. The specific characteristics of light source 48 are discussed below in conjunction with FIG. 7. A beam of light emanating from block 50 first strikes a mirror 52 which reflects the beam across the inside front of housing 42 to a symmetrically placed second mirror 54. Second mirror 54 reflects the beam toward the back of housing 42 to a third mirror 56, which in turn reflects the beam downward to a fourth mirror 58. The beam is then collected and focussed by a lens 60 and directed to a scanning mirror 62. As previously mentioned, the size of lens 60 should be selected so that the beam fully fills the lens; this is a function of the beam divergence of light source 48. Of course, a lens is not necessary if the light source is already collimated, e.g., a laser source. It is only necessary to provide a spot of light at the approximate location of the object being scanned.

Scanning mirror 62 is attached to a hub 64 which is connected to the shaft 66 of a motor 68. The motor may be secured to housing 42 by any mounting means, such as a bracket (not shown). Further details of motor 68 are also discussed below in conjunction with FIG. 7. Rotating mirrors, such as polygonal mirrors and galvanometric mirrors, have been used in prior art optical scanners. Polygonal scanning mirrors, however, are not spatially efficient since only a small portion of the cross-sectional area of a polygonal mirror is used during any one scan. This is in part a function of the amount of room that is needed to achieve full rotation of the mirror.

In contrast, scanning mirror 62 does not continuously rotate but rather oscillates, and it achieves a greater spatial efficiency in comparison to polygonal mirrors since the beam impinging on mirror 62 strikes a larger area with respect to the total cross-sectional area occupied by the mirror arrangement. This further enhances the compact nature of card reader 40. Also, the use of an oscillating mirror instead of a rotating polygonal mirror obviates problems associated with determination of the windage (rotational frequency) of a rotating mirror, which can adversely affect scanning performance. Scanning mirror 62 is thus closer to the prior art galvanometric mirrors but, as discussed below in connection with the description of motor 68, the scanning action of mirror 62 is achieved without the high expense of a galvanometric motor. Galvanometric motors also run continuously, and consume more power than the preferred form of motor 68.

When the incident light beam bounces off scanning mirror 62, it is directed toward an elongated mirror 70 which reflects the beam upward toward window 46 in cover 44. The focal length of lens 60 is chosen to focus the incident beam at or near window 46. The distance the incident beam must travel to the fringes of window 46 is longer than the distance to the center of window 46, so the beam cannot be perfectly focussed across the full length of window 46. The depth of field may be maximized by selecting a lens with a high f-number, or a "flat field" scanning lens may be used to focus the beam evenly across window 46, but this would require that the scanning mirror 62 be placed before the flat field lens arrangement. Instead, the depth of field of lens 60 may be used to focus the incident beam just inside window 46 at its extreme ends, but just outside window 46 at its center. In this manner, the beam is adequately focussed at any location along window 46.

Figure 5:
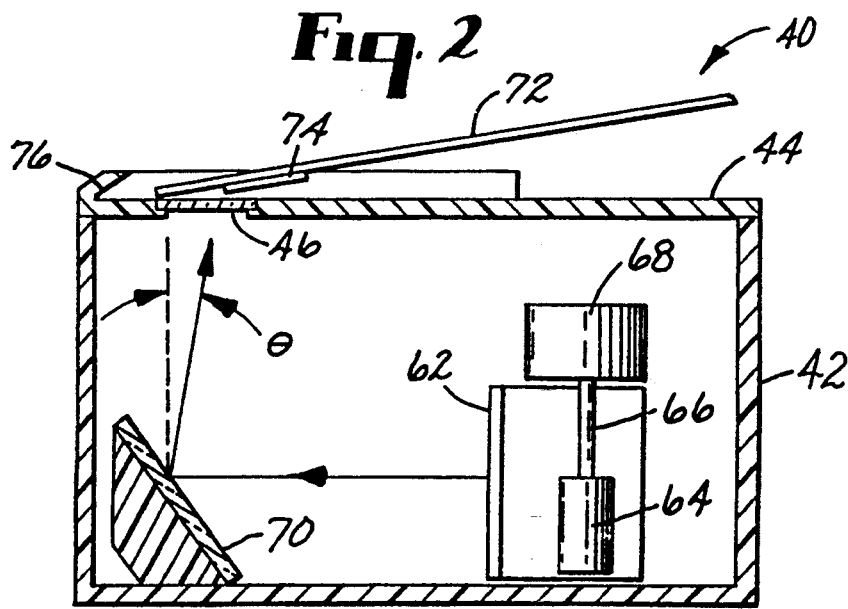
FIG. 5 is a cross-sectional view of the card reader embodiment of the present invention taken along lines 5—5 of FIG. 3, and additionally showing a card as it is inserted into the reader.

With further reference to FIG. 5, it can be seen that elongated mirror 70 is not oriented at a 45° angle with respect to the incoming ray from scanning mirror 62, but rather is slightly tilted from such an orientation (i.e., slightly rotated clockwise as viewed in FIG. 5). More importantly, the reflected beam passes through window 46 at an oblique angle, i.e., the incident angle θ is greater than 0°. This orientation insures that undesirable specular reflections (whether from the surface of window 46, or from the card resting on cover 44) will not return to lens 60; thus, such reflections are prevented from entering the return optics, and never interfere with the detection mechanism. Retroreflections and some diffuse reflections, however, will be gathered by mirror 70 and lens 60, and will travel backward along the incident optical path all the way to optical assembly block 50. A beam splitter inside block 50 (not shown in FIG. 4 but functioning identically to that shown in FIG. 1) then diverts the return signal to an optical detector (also not visible in FIG. 4). The optical detector and light source 48 are positioned the same distance from the beam splitter, so that the return signal converges (is focussed) at the optical detector, maximizing the signal level.

While the angle of incidence should be greater than zero degrees, it is nevertheless desirable to approach as closely as possible to this in order to maximize the amplitude of diffuse reflections and retroreflections, and maximize the linearity of the scan. Taking into consideration the spreading of the return signal, it can be shown that the minimum angle of incidence θ necessary to completely avoid specular reflections is given by the equation:

$$\theta = \arctan\left[\frac{D}{2L}\right]$$

where D is the effective diameter of lens 60, and L is the effective distance from lens 60 to window 46 (i.e., the distance along the optical path). In the preferred embodiment, the lens diameter is about 2.5 cm, and the effective distance between lens 60 and window 46 is about 10.8 cm, yielding an optimum angle of incidence of about 7°. As mentioned below, however, the preferred form of card reader 40 utilizes dual scanning beams, separated at window 46 (the approximate focal plane) by a distance of about 5.6 mm. In order to insure that specular reflections from both beams are not picked up by lens 60, it is necessary use a slightly higher angle of incidence, about 8°.

Although card reader 40 may be used to scan other objects besides cards, such as point-of-sale scanning of UPC labelled products, it was primarily designed for use with the Image Access System described in U.S. Pat. No. 4,994,987, assigned to the assignee of this application. This system utilizes image access cards each of which contain (i) a human readable representation of an electronically stored image, and (ii) machine readable data corresponding to the storage address of the electronically stored image. As noted in a related case, U.S. Pat. No. 5,001,696, it may be preferable in some instances to provide the human readable representation on one side of the card for viewing by the user, but provide the machine readable data on the reverse side of the card so that it may be read by a machine without obstructing the view of the human readable representation. This construction of the card is appropriate for use with card reader 40.

FIG. 5 depicts the placement of such a card 72 into reader 40. The card includes a scannable data field 74. In the preferred embodiment, cover 44 of reader 40 includes a rim or flange 76, which has two purposes. First of all, it is preferable to tilt the entire card reader 40 (rotate it about 30° counterclockwise from the orientation shown in FIG. 5) so that, when card 72 is placed therein, it can be viewed from the side, i.e., without the operator having to stand directly over the unit. Flange 76 therefore serves to support card 72 and keep it from sliding off of cover 44, and to keep scannable data field 74 overlying window 46. Additionally, flange 76 serves to complement the optical geometry of reader 40 with regard to the avoidance of specular reflections.

Specifically, placement of card 72 on reader 40 requires that the bottom edge of card 72 first be placed under flange 76. This means that, as card 72 is inserted and moves flush against cover 44, the incident ray travelling through window 46 never strikes card 72 at a right angle. This feature also relates back to the orientation of elongated mirror 70. If that mirror were tilted counterclockwise from a 45° orientation (rather than the clockwise tilt as depicted), and shifted slightly to the right as seen in FIG. 5, the incident beam would still strike window 46 at an oblique angle, but it is likely that the incident ray passing through window 46 would also strike card 72 at a right angle as the card is inserted, creating specular reflections. Accordingly, the disclosed construction virtually guarantees the avoidance of all specular reflections in reading scannable field 74 of card 72.

Figure 7:
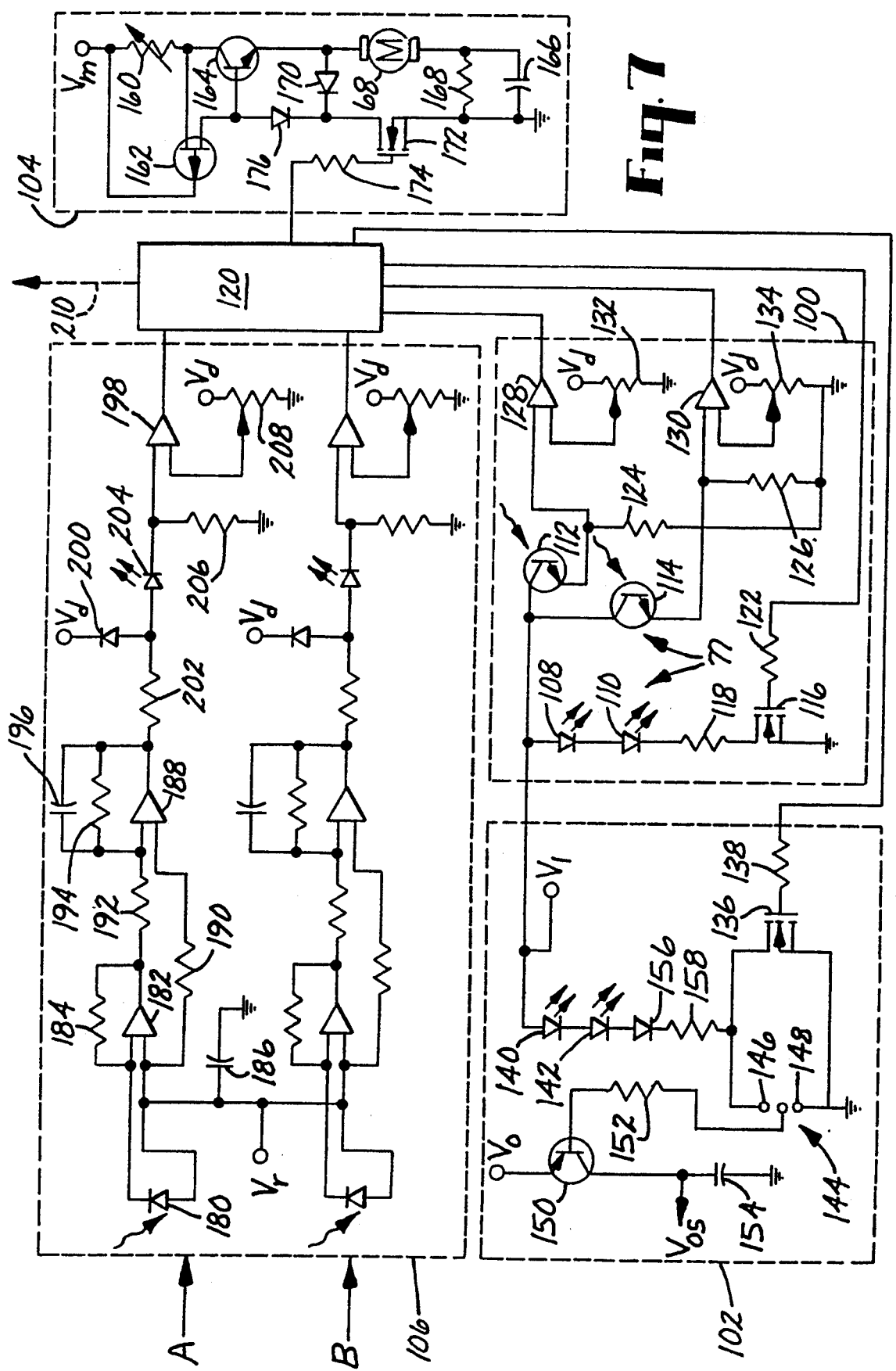
FIG. 7 is a detailed electrical schematic of the electrical systems of the presently preferred embodiment.

Card reader 40 may further include sensors 77 which detect the presence of card 72. These sensors allow reader 40 to be used in an "on demand" manner, rather than requiring continual scanning. This decreases power consumption as well as prolonging the working life of the various components of reader 40. Sensors 77, which are discussed further below in conjunction with FIG. 7, are preferably infrared optical detectors.

The above-described optical readers are useful in reading optical marks based on either retroreflection or diffuse reflection. It is, however, advantageous to use retroreflective markings since such markings are more easily detected, and require a less intense light source. Preferred retroreflective materials are available from Minnesota Mining & Manufacturing Company (3M), Traffic Control Materials Division, product number 3290, and 3M's Safety and Security Division, product number 8850. The mark may be composed of retroreflective materials on a plain substrate, or black marks placed on a retroreflective substrate (i.e., a retroreflective background). Similarly, while the readers may be used to scan any kind of optical mark (including scannable type face), the preferred embodiment is designed to read bar codes, as suggested in U.S. Ser. No. 544,657 referred to above.

In this regard, the novel bar code of the present invention may be used to encode data in scannable field 74 of card 72. This bar code may be referred to as a two-channel XOR code, and is illustrated in FIG. 6B. This coding should be compared to FIG. 6A which represents the closest prior art, a two-channel "fixed clock" scheme. In both figures, representative bar code sequences are shown for 8-digit binary numbers. For purposes of explanation, each of these sequences have been given a digital prefix of "00" and a suffix of "11, " except for exemplary code 95 which illustrates a code having black marks in the last cell in both channels which results in a suffix of "10." The sequences are read from left to right.

Figure 6A:
FIG. 6A is a depiction of the prior art two-channel clock/data bar code scheme.
Figure 6B:
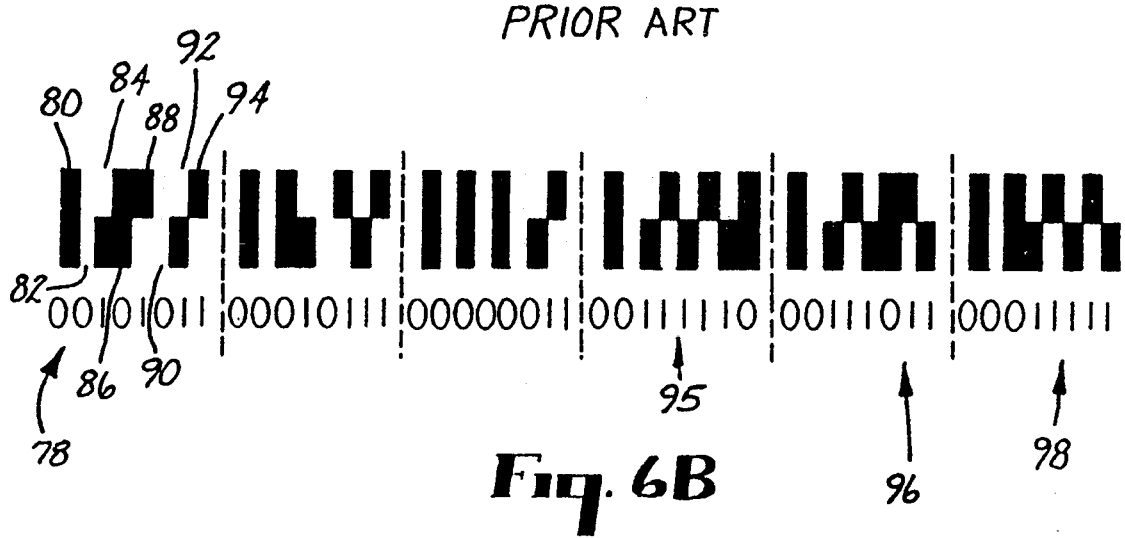
FIG. 6B is a depiction of the novel bar code scheme of the present invention.

Looking at FIG. 6A, it can be seen that the bottom half of each bar code sequence is identical, i.e., this half provides the reference marks against which the marks in the upper half of the code are compared. The bottom half is referred to as the clock channel, while the top half is referred to as the data channel. The binary digit (bit) is encoded by placing either a white stripe (for zero) or a black stripe (for one) along the data channel at a point corresponding to the edge of the next clock channel stripe. In other words, the clock edge is used to strobe the data into a register.

In the novel code of FIG. 6B, neither channel can be said to clearly be the clock channel, but rather both channels together operate as the clock channel. In other words, a transition on either channel will generate the clock reference signal and being the data conversion algorithm. The data bit encoded at any given transition is the XOR (logical exclusive OR) of the binary values of both channels.

Take for example the initial bar code sequence 78 in FIG. 6B; assume that a black mark represents a binary value of 1, and a white mark (space) represents a binary value of 0 (these assignments are arbitrary and, as explained further below, could be reversed). It should be noted that a mark may or may not be reflective, e.g., the marks may comprise small stripes of retroreflective material, or may be non-reflective stripes on a retroreflective background. It is, therefore, understood that a "space" (or white mark) means a stripe having background reflectivity, and a (black) "mark" means a stripe having a reflectivity which contrasts with the background. The first data bit (the black stripe encoded in data block or cell 80) is zero, since both channels are black (binary value 1) and the XOR operation on these two values yields a zero. The second data bit (the white stripe encoded in cell 82) also represents a zero, since both channels are white (binary value 0) and the XOR operation on these two values also yields a zero. These first two data bits denote the previously mentioned prefix "00", and it will be seen that this pattern occurs at the beginning of each bar code sequence in FIG. 6B.

The next (third) cell 84 is black along the lower channel and white along the upper channel. The XOR operation (1 xor 0) is thus 1. The fourth cell 86 in sequence 78 is black in both channels, and so corresponds to a data value of 0. The fifth cell 88 is black in the upper channel and white in the lower channel, corresponding to a data value of 1. The sixth cell 90 is totally white, yielding a data value of 0. Finally, the seventh and eighth cells 92 and 94 have different binary values in the upper and lower channels, yielding data values for these cells of 1. It will further be noted that each bar code sequence in FIG. 6B terminates in two data blocks having different binary values in the upper and lower channels; these final two cells correspond to the "11" suffix.

The reader may detect that a general pattern is now emerging. Any cell in which the color (binary value) is the same in both the upper and lower channels is a "zero," while any cell in which the upper and lower channels differ is a "one." This is true regardless of the actual binary values assigned to the marks and spaces, due to the nature of the XOR operator. This also means that the receiver is insensitive to the interchange of the two channels and that, in some circumstances, a given number may be represented in the XOR coding scheme by an inverted bar code, which is not true for prior art bar codes. For example, the data bit of 1 associated with cell 84 in the first sequence 78 is represented by an upper white mark (a space) and a lower black mark; this data bit could just as easily have been represented by an upper black mark and a lower space. This does not mean, however, that equivalent marks can always be interchanged. For example, the data sequence "00" cannot be represented by two successive black stripes, because there would be no cognizable transition between the two cells. This requirement also explains why, although each sequence in FIG. 6B terminates with the "11" suffix, the final two cells in sequences 96 and 98 are not identical to the final two cells in the other sequences.

For reasons explained further below, the encoding algorithm preferably establishes one channel (arbitrarily) as the "clock" channel for the first mark or space, and then alternates the clock channel between the upper and lower channels for successive marks and spaces. In other words, a recognizable transition (mark-to-space or space-to-mark) should alternate between channels. For each data sequence illustrated in FIG. 6B, the lower channel is initially selected as the clock channel. This means that a transition occurs in the lower channel when scanning from the background to the first cell (i.e., the first bit in the lower channel is a mark since the background is white-equivalent to a space). The next transition, between the first and second cells, must occur in the upper channel (in each data sequence in FIG. 6B, there is a transition between the first and second cells in both channels only due to the "00" preamble). The next mandatory transition, between the second and third cells, must occur in the lower channel. This is why the data bit of 1 in cell 84 is represented by an upper space and lower mark, rather than an upper mark and a lower space as discussed in the preceding paragraph. It will be appreciated, however, that the initial choice of the clock channel is truly arbitrary, and furthermore does not affect decoding by optical reader 40. The primary reason for using the alternating clock encoding scheme is to provide a 2:1 width ratio in the marks and spaces, as discussed further below.

Referring now to FIG. 7, a detailed schematic diagram of the electrical system of card reader 40 is shown, as designed for reading the two-channel bar code of the present invention. The electrical system may be broken down into four circuits, card sensor circuit 100, power circuit 102, motor control circuit 104, and optical mark detection circuit 106; each of these circuits are indicated by the dashed boxes in FIG. 7.

Card sensor circuit 100 includes the sensors 77 shown in FIG. 4, which are comprised of light-emitting diodes (LED's) 108 and 110, and phototransistors 112 and 114. These components are paired together at either side of card reader 40 under window 46, i.e., LED 108 and phototransistor 112 are positioned adjacent one another at the right edge of window 46, while LED 110 and phototransistor 114 are positioned adjacent one another at the left edge of window 46. In this manner, when a card 72 is placed on cover 44 of reader 40, light from the LED's reflects off card 72 and is sensed by the phototransistors. Preferably, the LED's emit, and the phototransistors detect, infrared radiation.

Although LED's 108 and 110 may be continually supplied with a voltage $V_L$ (typically a 5-volt power source), if reader 40 is powered by a battery then the voltage to the LED's should be pulsed (e.g., about every 10 milliseconds). This may be controlled by a metal-oxide semiconducting field-effect transistor (MOSFET) 116 which connects the LED's to ground via a current limiting resistor 118. The gate of MOSFET 116 is connected to a controller 120 which, in the preferred embodiment, is a microprocessor such as that sold under part number D83C51FA by Intel Corporation of Santa Clara, Calif., which includes a masked read-only memory (ROM), random-access memory (RAM) and a universal asynchronous receiver-transmitter (UART). A resistor 122 protects MOSFET 116 from electrostatic discharge, and further protects microprocessor 120 against catastrophic failure of MOSFET 116. Other switching means, such as a simple transistor, may be substituted for MOSFET 116.

The outputs of phototransistors 112 and 114, which are loaded by resistors 124 and 126, are directed to comparators 128 and 130, respectively. Two potentiometers 132 and 134 set the reference voltage for comparators 128 and 130, the reference voltage being derived from $V_d$ (for digital voltage) which, in the preferred embodiment, is 5 volts (i.e., $V_d=V_L$). The comparator outputs are then directed to microprocessor 120. Thus, when card 72 is placed in the proper position on cover 44, the output of both comparators 128 and 130 are switched to an active state.

The ROM in microprocessor 120 includes program instructions which respond to this state by sending appropriate control signals to power circuit 102 and motor control circuit 104. Power circuit 102 is controlled via another MOSFET 136. Resistor 138 protects MOSFET 136 from electrostatic discharge, and further protects microprocessor 120 from catastrophic failure of MOSFET 136. MOSFET 136 serves as a switch to limit power consumption by (i) the operational amplifiers ("op amps") used in detection circuit 106, and (ii) the LED's 140 and 142 used as light source 48. In this regard, FIG. 7 includes a jumper 144 having two terminals 146 and 148. If the unit is designed to run off an external power source, then power consumption is not critical and the jumper may be connected to terminal 148, bypassing the op amp switching effect of MOSFET 136. If, however, card reader 40 is designed to run off battery power, then jumper 144 should be connected to terminal 146, in which case power to the op amps and LED's 140 and 142 will be controlled by MOSFET 136. Other switching means, such as a transistor, may be used in place of MOSFET 136.

The power for the op amps is indirectly supplied by a voltage source $V_o$ which is controlled by a transistor 150. When jumper 144 is connected to terminal 146, transistor 150 is affected by MOSFET 136 via current limiting resistor 152. In the preferred embodiment, $V_o$ is a 30 volt source, and is the same source that powers motor 68. Therefore, a capacitor 154 is preferably used to filter out any low frequency noise from the op amp power supply $V_o$. Although not shown, each op amp package includes a decoupling capacitor across its power supply ($V_{os}$) to remove parasitic oscillations.

Power to LED's 140 and 142 are supplied by the same source as for LED's 108 and 110, viz., $V_L$. When MOSFET 136 is conducting, current flows through LED's 140 and 142 to ground, with an intervening diode 156 and a current limiting resistor 158. Diode 156 is used to prevent the voltage differential between $V_o$ and $V_L$ from turning on transistor 150, and also serves to block LED's 140 and 142 (which exhibit a high reverse voltage leakage current) from receiving excessive reverse voltage.

In the preferred embodiment, LED's 140 and 142 are high intensity and have a beam divergence of about an 8° cone angle. The specific components used are Gallium-Aluminum-Arsenide LED's sold by Hewlett-Packard of Palo Alto, Calif., under part number HLMP4101. Several other types of LED's may be used, although they should preferably be high-intensity and have a beam divergence which complements the optical geometry of card reader 40. For example, the LED's used in practice emit a visible red beam, but infrared LED's might be used, in which case window 46 could appear black, although it would pass IR radiation. Other types of light sources may be used, including lasers or laser diodes. These components are, however, more expensive and consume more power. As noted above, if the scannable field 74 on card 72 includes retroreflective marks, then a high intensity LED provides more than sufficient incident radiation to create a detectable retroflection. Contrast ratios as high as 80:1 have been achieved using this construction.

When microprocessor 120 sends the control signal to power circuit 102, it contemporaneously sends a control signal to motor control circuit 104. Motor control circuit 104 includes motor 68 which, in the preferred embodiment, is a permanent magnet direct-current motor, and is powered by voltage source $V_m$ (preferably about 30 volts). The current from this source is regulated by variable resistor 160, junction field-effect transistor (JFET) 162, and transistor 164 which together provide a constant current source.

Prior to receiving the control signal which activates circuit 104, current from the emitter of transistor 164 drives motor 68 to a home position, i.e., biased so that incident radiation striking scanning mirror 62 will first be directed toward one end, but not the center, of elongated mirror 72. Pads or stops (not shown) are provided adjacent scanning mirror 62 to limit extreme movement thereof. As motor 68 is driven to this home position, a large (e.g., 100 microfarad) capacitor 166 is charged. A bleed resistor 168 insures that the motor, and thus scanning mirror 62, maintains its bias in the home position. A diode 170 prevents current from JFET 162 from being shunted through motor 68 during the charging of capacitor 166.

When a card is detected by sensor circuit 100, microprocessor 120 sends a control signal to another MOSFET 172 (via protective resistor 174), which allows capacitor 166 to discharge to ground through motor 68. During this discharge cycle, another diode 176 shunts the current which normally flows from JFET 162 to transistor 164. Diode 170 also provides a biasing voltage drop which turns off transistor 164. Although other switching means (such as a transistor) may be substituted for MOSFET 172, it is desirable to use a component which allows high current flow with a low voltage drop across MOSFET 172 (e.g., <0.2 volts). The MOSFET sold by Motorola Corp. of Schaumburg, Ill., under part number MPF9200 is suitable for this purpose.

Capacitor 166 discharges in about 4 milliseconds, but this creates sufficient momentum in motor 68 to provide a smooth rotation of scanning mirror 62. In the described embodiment, it takes about 40 ms to complete the scan across window 46. Shortly after this delay, microprocessor 120 cuts off the control signal to motor control circuit 104, which allows motor 68 to return to its home position and capacitor 166 to reenergize. Power circuit 102 is turned off during this delay. One advantage in the construction of motor control circuit 104 is the fact that there is minimal current from voltage source $V_m$ during the half-cycle of scanning since motor 68 is not directly powered by $V_m$. Instead, the power for energizing motor 68 during the scan is stored in capacitor 166 which is charged before scanning takes place. This eliminates the introduction of noise into the electrical system (for both light source 48 and detection circuit 106) which could result in an erroneous reading.

In accordance with the foregoing, when sensor circuit 100 detects the presence of card 72, LED's 140 and 142 are powered, power flows to the op amps in detection circuit 106, and motor 68 begins to scan. It will therefore be appreciated that the combination of card sensor circuit 100, power circuit 102, and motor control circuit 104 provide an "on demand" system. In other words, card reader 40 is not continually scanning (which would drain a battery power source and cause excessive wear on the mechanical and electrical components), but rather only scans when a card 72 is placed on cover 44.

Optical mark detection circuit 106 is now explained. That circuit includes two channels A and B which are essentially identical, so only one set of reference numerals is used to describe the components therein. Each channel includes a photodiode 180 which responds to the reflections from scannable data field 74. The two photodiodes are placed adjacent one another in card reader 40 at the same spacing that exists between the light source LED's 140 and 142, so that they respond, respectively, to the separate channels in the two-channel XOR bar code. Photodiodes available from EG&G Vactec, Inc., of St. Louis, Mo., under part number VTB9413, may be used.

The photodiodes are connected to op amps 182 and feedback resistors 184, and operate in a zero bias mode. A reference voltage $V_r$ is provided to bias op amps 182 away from the negative rail voltage, and a filter capacitor 186 eliminates high frequency noise from $V_r$. In the preferred embodiment, $V_r$ is the same as $V_L$ and $V_d$ (5 volts). The outputs of op amps 182 are connected to the negative inputs of op amps 188, while their positive inputs are connected to current biasing resistors 190. It is understood that the voltage $V_{os}$ output by power circuit 102 provides power to op amps 182, as well as op amps 188.

Each of the op amps 182 and 188 are used to amplify the signal from photodiodes 180, and each op amp has a gain of about 100. Resistors 192 and 194 are used to adjust the gain of op amps 188. In the preferred embodiment, the op amps are those sold by National Semiconductor Corp. of Santa Clara, Calif., under part number LF412. Capacitors 196 act as bandwidth limiters to eliminate parasitic oscillations between op amps.

The outputs of op amps 188 are connected to comparators 198. Although not shown, it is understood that comparators 198 are provided with a power source, such as 5 volts. Voltage source $V_d$ provides the bias voltage for the clipping diodes 200 that protect the comparators from excessive voltages emanating from the op amps. Current limiting resistors 202 protect clipping diodes 200. Another set of LED's 204 are used to drop the bias voltage; this places the signal within the operating range of comparators 198. Other means could be provided in place of LED's 204 to achieve this voltage drop, such as a stack of pin diodes. Resistors 206 are used to bias LED's 204. Potentiometers 208 set the reference voltage for comparators 198, the reference voltage again being derived from $V_d$. The outputs of the comparators, which are essentially binary signals corresponding to the optical marks on card 72, are directed to microprocessor 120.

Microprocessor 120 may be programmed to perform data analysis of the output of detection circuit 106 in a variety of ways. In the preferred embodiment, this is accomplished by measuring, for each channel, the time intervals between transitions (either from a binary 0 to binary 1 or vice-versa). These time intervals are used to reconstruct the bit sequence for each channel, and the XOR operation may then be performed on successive pairs in the bit sequences. To facilitate this measurement, the bar code of the present invention preferably limits the width of any space or mark in a given channel to twice the minimum width. In other words, the width of any given mark or space is either short (one "unit") or long (two "units"); the data sequences shown in FIG. 6B adhere to this convention. This coding scheme has several advantages as discussed below.

Figure 8:
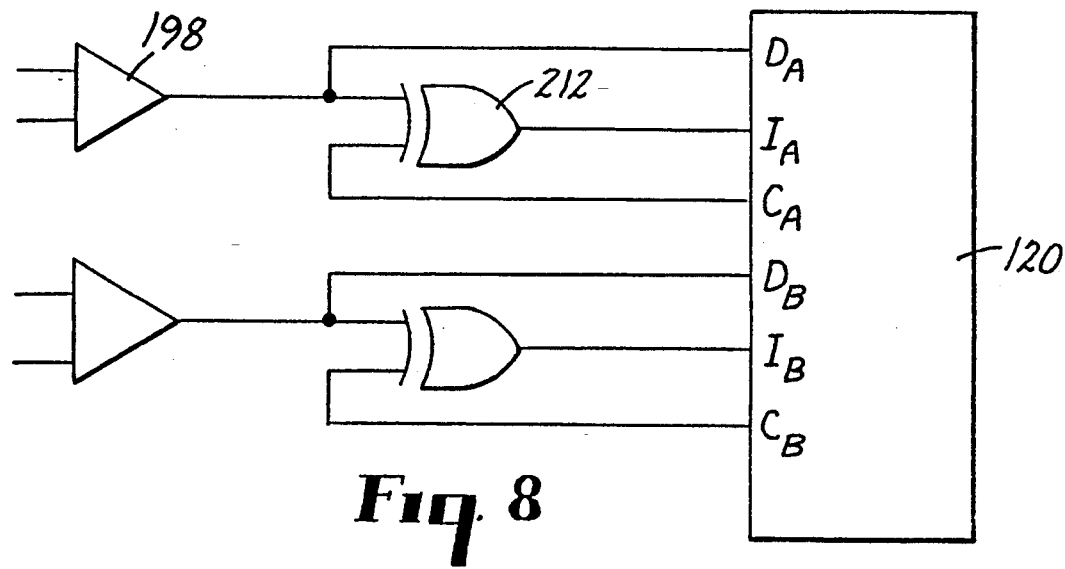
FIG. 8 is a detailed electrical schematic depicting the interface between the optical mark detection circuit and the microprocessor of the optical reader of the present invention.
Figure 9A:
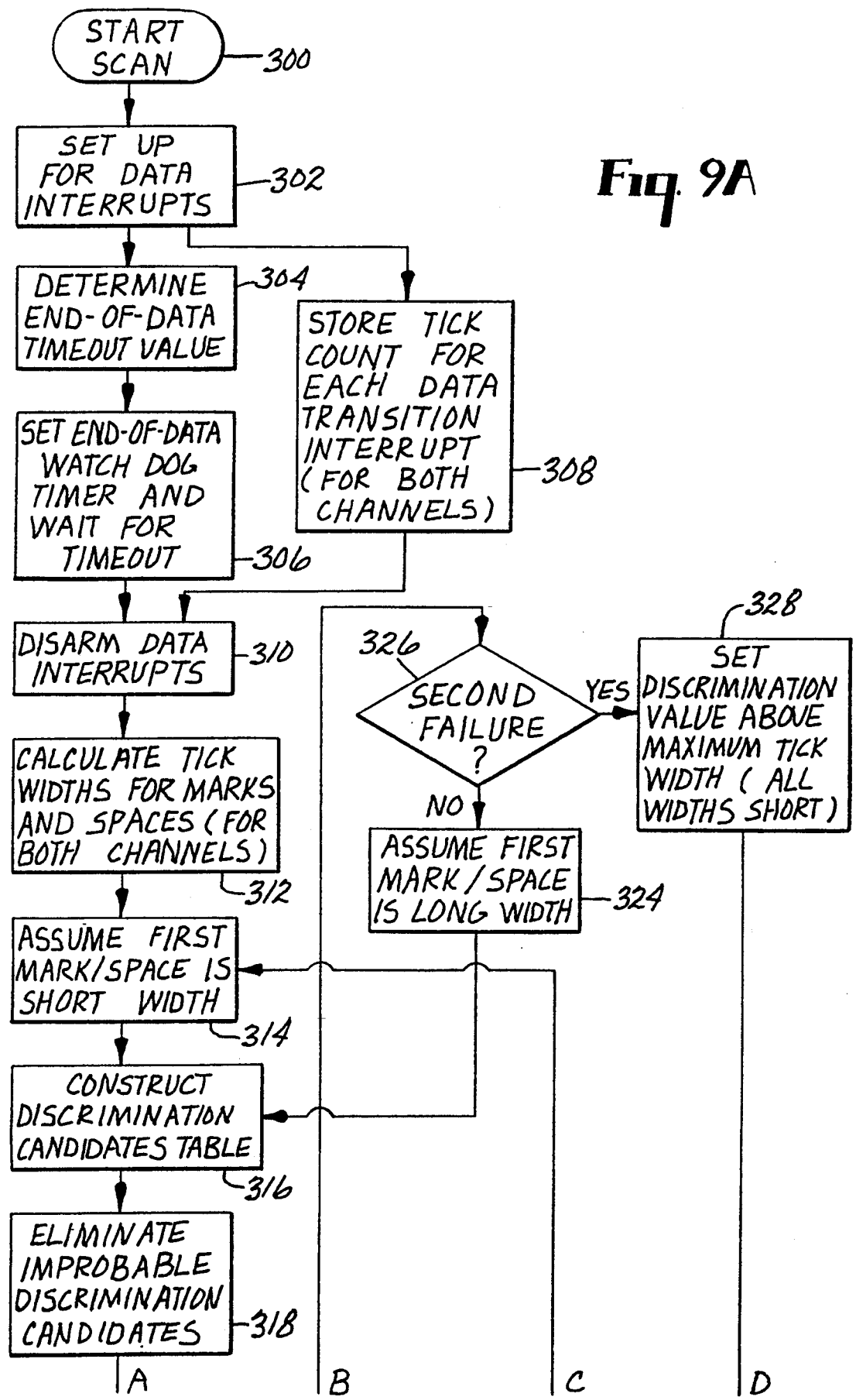
FIGS. 9A and 9B are a flow chart of the instructions carried out by the processor residing in the optical reader in decoding the two-channel XOR bar code.
Figure 9B:
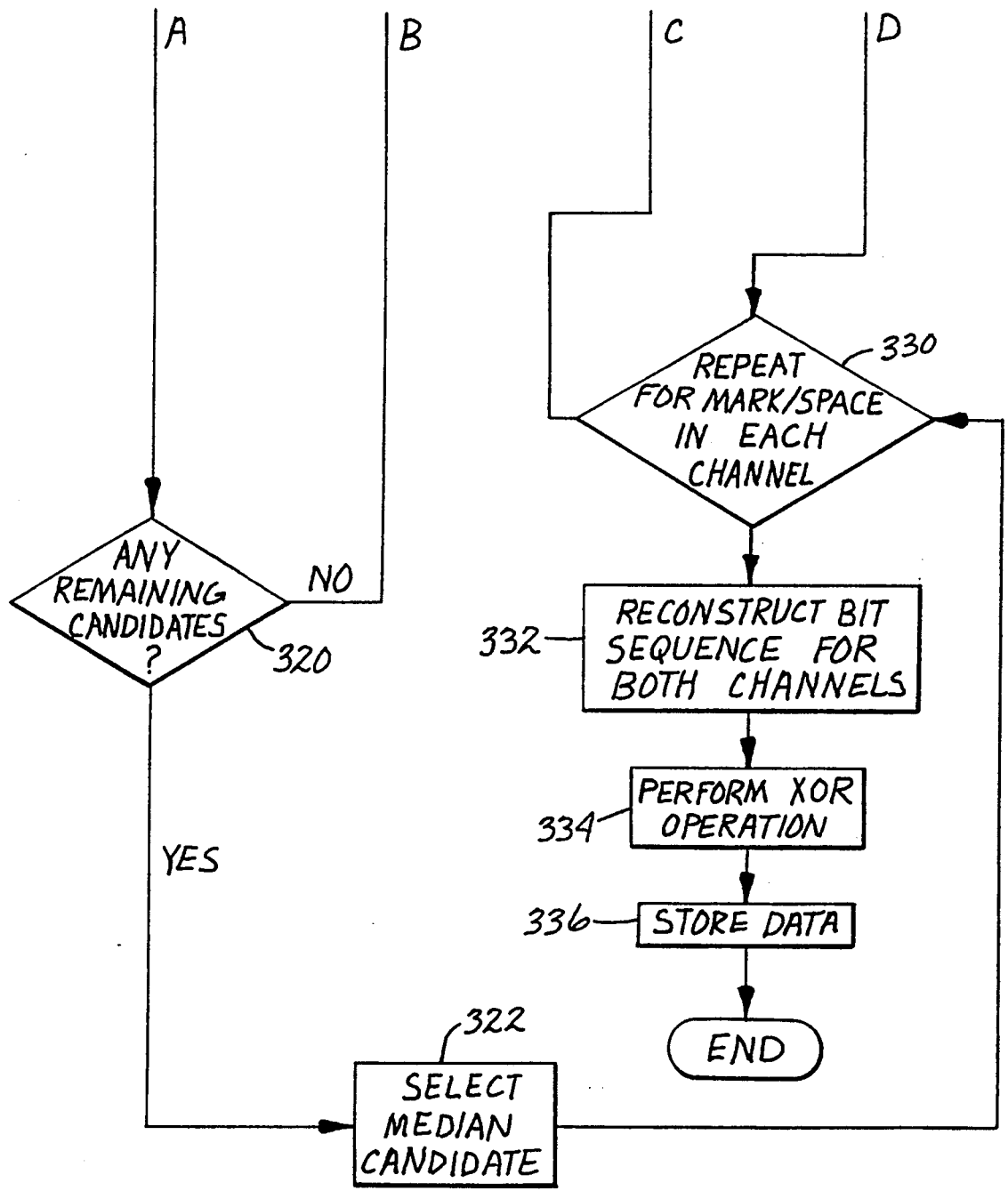

In order to measure the time intervals between the transitions, the outputs of each channel are coupled to interrupt lines on microprocessor 120. FIG. 8 details one embodiment of the interface between optical mark detection circuit 106 and microprocessor 120. The output from comparator 198 of channel A is connected to one input of an XOR gate 212, and also to the data input line $D_A$ of microprocessor 120. The other input to gate 212 is a control line $C_A$ from microprocessor 120. The output of gate 212 is directed to the interrupt line $I_A$ of microprocessor 120. The same configuration is provided for channel B. The function of gate 212 may be understood with further reference to FIGS. 9A and 9B, a flow chart of the steps carried out by microprocessor in accordance with the ROM-stored program instructions.

As previously explained, scanning begins (300) when microprocessor 120 receives an appropriate signal from card sensor circuit 100. Microprocessor 120 then sets up for the data interrupts (302). The interrupts are set by (i) checking the initial status of the data lines $D_A$ and $D_B$, (ii) setting the output of the control lines $C_A$ and $C_B$ to a level which results in an appropriate output of the XOR gates based on the type of interrupt being used, and (iii) enabling microprocessor 120 to receive signals from interrupt lines $I_A$ and $I_B$. For example, assume that microprocessor 120 is provided with rising-edge interrupts, i.e., interrupt line $I_A$ will generate an internal signal only when the output of gate 212 changes from a binary 0 to a binary 1. In such a case, the output of gate 212 should be set to 0 initially and after each transition. If the interrupt were instead a falling-edge type, then the output should be set to 1 initially and after each transition.

As it happens, this means that the control line should be set to a value corresponding to the logical XOR of (i) the comparator output and (ii) the desired output of gate 212 based on the interrupt type. As a further example, assume again that the interrupt is a rising-edge type, and the initial (or post-transition) output of comparator 198 is a binary 0. In such a case, control line $C_A$ is also set to binary 0, and the resulting output of gate 212 is a binary 0, which will result in a rising edge at the next data transition. In contrast, if the initial (or post-transition) output of comparator 198 were a binary 1, then control line $C_A$ should be set to binary 1, still resulting in an output at gate 212 of binary 0. There are many alternative methods of arming the interrupts, e.g., by using a NOR gate in lieu of XOR gate 212 or by changing the interrupt edge logic within microprocessor 120.

After so arming the data interrupts, microprocessor 120 may begin timing the intervals between transitions. Initially, however, it is useful to determine a timeout value which allows the microprocessor to discern the end of the bar code sequence (304); this may also be accomplished by several methods. In the preferred embodiment a "start" pattern or transition is widely spaced from the actual bar code. For example, if the bar code is printed on a retroreflective label which is applied to the substrate being scanned, then the start transition may be the edge of the retroreflective label; this provides a discernable transition to the background region. The amount of time it takes to scan from the start transition to the first bar code cell can be used to determine the timeout value. Although the start transition is detected prior to arming the interrupts, the end-of-data timeout value is actually computed after arming, in fact, after receipt of the first data interrupt signal. Microprocessor 120 sets a watchdog timer to check for the timeout condition (306). While waiting for the timeout, microprocessor 120 records the tick count (time) of each transition interrupt signal generated by interrupt line $I_A$, and the tick count of each transition interrupt signal generated by interrupt line $I_B$ (308).

After timeout occurs, the data interrupts are disarmed (310) and microprocessor 120 begins to convert the tick count data into bit sequences. Tick widths (time intervals) are calculated for each mark and space, for both channels (312). The next several steps (314–330) relate to determining a discrimination value to identify each mark or space as being either short or long. In this regard, it will now be understood that the determination of width size is simplified by limiting the widths to these two sizes as discussed above. In a qualitative sense, it is then easy to group each tick count into either small or large values, corresponding to short or long widths, respectively.

In practice, however, it may be difficult to perform this grouping due to the limited amount of memory (RAM) usable by microprocessor 120, and due to the variability in the tick widths associated with each data bit (due to printing flaws, friction in scanning motor 68, etc.). For example, one encoding scheme (described further below) utilizes a bar code having 52 data bits in each channel; theoretically, this could result in 52 different tick widths. The number of tick width values can, however, be limited to the desired range by appropriately setting the tick resolution (i.e., the absolute time corresponding to one tick).

Nevertheless, the limited amount of memory necessitates certain extra steps in the determination of the discrimination value. The first such step is the assumption that the tick width associated with the first mark or space (in one channel only) is short (314). A table of potential discrimination values is then constructed (316). This table (limited to 15 entries in the preferred embodiment), is constructed by first estimating the discrimination value and placing this value in the center of the table. Since a long width is twice the value of a short width, and since we are assuming that the first tick width is short, it is natural to estimate the discrimination value at one and one-half times the value of the first tick width. For example, if the tick width of the first mark or space is 8 ticks, a good estimate of the discrimination value is 12 ticks. The table is then filled in with consecutive values above and below the estimated discrimination value, e.g., a 15 entry table might include the following tick width values: 5-6-7-8-9-10-11-12-13-14-15-16-17-18-19.

After the discrimination candidates table is constructed, improbable discrimination values are eliminated (318). Improbable values include (i) actual recorded tick width values, (ii) values below the lowest actual tick width value, and (iii) values above the highest actual tick width value. Continuing the above example, if the first mark or space was indeed a short width, then the actual recorded tick width values might be 7, 8, and 9 (for short widths), and 15, 16, and 17 (for long widths). Eliminating improbable discrimination values leaves only the following values as likely discrimination candidates: 10, 11, 12, 13, and 14. If there are indeed such candidates remaining after elimination of improbable values (320), then the median of these candidates (rounded down in the case of a fractional median, i.e., an even number of remaining candidates) is selected as the discrimination value (322).

On the other hand, if the assumption in step 314 is incorrect, a totally different result may occur. Those skilled in the art will appreciate that, if the initial tick width corresponds to a long width, then elimination of improbable values from the discrimination candidates table may result in no remaining candidates. If this is the case, the program corrects itself and assumes that the first mark or space is a long width (324), and then repeats the earlier steps.

Finally, there is one special case which deserves further attention. If all of the marks and spaces in a given sequence are of short width, then the foregoing algorithm will yield no potential candidates no matter which assumption is made concerning the length of the first mark or space. If this occurs, the algorithm fails twice (326), and the program recognizes that all tick widths are short and arbitrarily sets the discrimination value above the maximum actual recorded tick width (328). This entire procedure is repeated for marks and spaces in both channels (330).

Those skilled in the art will appreciate that the foregoing assumptions may be avoided by using additional conventions in the encoding scheme, such as an appropriate preamble in the code, e.g., a three-bit preamble wherein the first two data cells are known to be a short mark and a short space. It is also convenient to provide a postamble which includes a mark in both channels, for better recognition of data termination.

Once the discrimination values for each channel have been ascertained, it is a simple matter to classify each tick width as being either short or long. From this information, it is elementary to reconstruct the original bit sequence for each channel (332), since microprocessor 120 knows that the successive tick widths correspond to successively alternating marks and spaces. Once the bit sequences for both channels have been reconstructed, it is also elementary to perform the XOR operation on the bit pairs in sequential data cells (334). The result corresponds to the binary data encoded in the bar code, and may be stored for later processing (336).

The reader may now appreciate the several advantages associated with the provision of only two sizes of marks or spaces. First of all, this ratio makes the discrimination candidates table more compact, which again may be important due to memory limitations. Use of this technique also makes the actual, absolute width of a given mark or space irrelevant, although the clock within microprocessor 120 should be "tuned" to approximate values involved, for filling in discrimination candidate table. Such tuning may be interactive, e.g., based on an initialization pre-scan. Finally, the 2:1 ratio between long and short marks or spaces provides a form of error checking. It should be noted that the 2:1 ratio is a direct result of the previously discussed alternating clock encoding scheme. Thus, the preferred form of the bar code of the present invention is an alternating clock, two-channel XOR bar code.

The reader may wonder why this somewhat complicated procedure is used as opposed to a simpler construction, such as an XOR gate directly connected to the comparators 198, with the output of the XOR gate connected to the data line of microprocessor 120. Although this latter construction is theoretically possible (and is equivalent to the broadest function of microprocessor 120 in deciphering the data), there are several problems associated with such a simple design, such as variations in signals due to optomechanical considerations during the scan, discrimination levels for the comparators, etc. The previously described algorithm is useful in minimizing or eliminating errors due to these kinds of problems.

Other types of error checking may also be integrated into the two-channel XOR code, such as cyclic redundancy or triple redundance. In the embodiment discussed further below for use in the Image Access System, a checksum is used to confirm valid data. As previously mentioned, the bar code encodes 52 bits; three of these bits comprise a preamble, two comprise a postamble, 39 are used for the actual data, and eight are used for the checksum.

The final data sequence resulting from step 334 may further be manipulated within microprocessor 120, or may be directed to another central processing unit (CPU) as indicated at 210 by the UART. For example, in the previously mentioned Image Access System, the data encoded on the image access card corresponds to the storage address of an electronically stored image. The data may be the actual storage address or an assigned number which can be associated with the storage address through a reference table. In such a system, microprocessor 120 would output the access data to a CPU which would then determine the storage address of the image, retrieve the image information and forward it to a display device.

As mentioned in the related application Ser. No. 455,834, the CPU (or, e.g., microprocessor 120) may be programmed to recognize a valid data sequence. If the initial scan by reader 40 results in such a valid sequence, then microprocessor 120 cuts off the control signal to power circuit 102. If, on the other hand, an invalid sequence is recorded, then the control signal to power circuit 102 switches back on, and a second control signal is sent to motor control circuit 104, resulting in another scan. This may be repeated indefinitely until a valid sequence is obtained; however, it is deemed preferable to limit such repetitions to three scans after which, if the data still appears to be invalid, an annunciator (not shown) on reader 40 may be illuminated to alert the user to a potential problem, e.g., a marred bar code on card 72, or improper placement of the card on cover 44.

In this regard, microprocessor 120 is programmed to recognize when the card is removed from reader 40, i.e., when the states of comparators 128 and 130 change from their high setting. In this manner, when one card is removed from reader 40 and another placed thereon, the foregoing process will be repeated to capture the data sequence of the next card.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. For example, the two-channel XOR bar code need not be in the exact format shown in FIG. 6B; it could take on other variations (such as phase shifted cells similar to that shown in FIG. 6A) provided that the data is still encoded in the exclusive-or combination of two channels. Indeed, the lower and upper channels need not be contiguous or even aligned, so long as means are provided to associate or synchronize the upper and lower channels. With reference to the claims, this means that a "cell" need not be comprised of two contiguous, aligned marks or spaces. It is therefore contemplated that the appended claims will cover such modifications that fall within the true scope of the invention.

I claim:

1. An apparatus for optically scanning a substrate which has a bar code printed thereon, and for decoding the bar code, the bar code having two generally parallel channels comprising a series of marks and spaces representing first and second bit sequences, respectively, each bit in said first sequence being associated with a bit in said second sequence, forming successive pairs of associated bits, wherein the data is encoded in the logical exclusive-or combination of each of said successive pairs of bits, and the substrate includes a label applied thereto, the bar code being printed on said label, said label providing a background region which contrasts with the substrate, thereby forming a discernable transition from the substrate to the background region, the transition being spaced from said bar code, the apparatus comprising:

housing means;

means, located within said housing means, for providing light;

lens means located within said housing means for directing said light along a path which intercepts the location of the substrate to be scanned;

first and second light receiving detection means located within said housing means;

means for collecting light reflected from both channels of the bar code on the substrate, and for transmitting (i) light reflected from a first one of the channels to said first detection means and (ii) light reflected from a second one of the channels to said second detection means; and processor means connected to said first and second detection means for (i) converting the outputs of said first and second detection means into said first and second bit sequences, respectively, (ii) correlating the bits in said first and second bit sequences into successive pairs, and (iii) determining the logical exclusive-or combination of said successive pairs of bits, said processor means including means for determining a timeout value based on the scan time between the transition and the channels, and watchdog timer means for detecting a timeout condition based on said timeout value.

2. The apparatus of claim 1 further comprising means for interfacing said processor means with said first and second detection means.

3. The apparatus of claim 1 wherein said processor means converts said output of said first and second detection means into said first and second bit sequences by (i) detecting each mark/space transition in each channel, (ii) measuring the time intervals between each said transition, said time intervals corresponding to the widths of each mark and space, and (iii) constructing said bit sequences based on said time intervals.

4. An apparatus for optically scanning a substrate which has a bar code printed thereon, and for decoding the bar code, the bar code having two generally parallel channels comprising a series of marks and spaces representing first and second bit sequences, respectively, each bit in said first sequence being associated with a bit in said second sequence, forming successive pairs of associated bits, wherein the data is encoded in the logical exclusive-or combination of each of said successive pairs of bits, the apparatus comprising:

housing means;

means, located within said housing means, for providing light;

lens means located within said housing means for directing said light along a path which intercepts the location of the substrate to be scanned;

first and second light receiving detection means located within said housing means;

means for collecting light reflected from both channels of the bar code on the substrate, and for transmitting (i) light reflected from a first one of the channels to said first detection means and (ii) light reflected from a second one of the channels to said second detection means;

processor means connected to said first and second detection means for (i) converting the outputs of said first and second detection means into said first and second bit sequences, respectively, (ii) correlating the bits in said first and second bit sequences into successive pairs, and (iii) determining the logical exclusive-or combination of said successive pairs of bits, said processor means including first and second data lines, first and second interrupt lines, and first and second control lines; and means for interfacing said processor means with said first and second detection means, said interfacing means comprising first and second XOR gates each having two inputs and one output, wherein:

said output of said first detection means is connected to one of said inputs of said first XOR gate and to said first data line, said first control line is connected to the other one of said inputs of said first XOR gate, said output of said first XOR gate is connected to said first interrupt line, said output of said second detection means is connected to one of said inputs of said second XOR gate and to said second data line, said second control line is connected to the other one of said inputs of said second XOR gate, and said output of said second XOR gate is connected to said second interrupt line.

5. An apparatus for optically scanning a substrate which has a bar code printed thereon, and for decoding the bar code, the bar code having two generally parallel channels comprising a series of marks and spaces representing first and second bit sequences, respectively, each bit in said first sequence being associated with a bit in said second sequence, forming successive pairs of associated bits, wherein the data is encoded in the logical exclusive-or combination of each of said successive pairs of bits, and the widths of each of the marks and spaces in the bar code is either short or long, the long width being approximately equal to twice the short width, the apparatus comprising:

housing means;

means, located within said housing means, for providing light;

lens means located within said housing means for directing said light along a path which intercepts the location of the substrate to be scanned;

first and second light receiving detection means located within said housing means;

means for collecting light reflected from both channels of the bar code on the substrate, and for transmitting (i) light reflected from a first one of the channels to said first detection means and (ii) light reflected from a second one of the channels to said second detection means; and processor means connected to said first and second detection means for (i) converting the outputs of said first and second detection means into said first and second bit sequences, respectively, (ii) correlating the bits in said first and second bit sequences into successive pairs, and (iii) determining the logical exclusive-or combination of said successive pairs of bits, said processor means converting said output of said first and second detection means into said first and second bit sequences by (i) detecting each mark/space transition in each channel, (ii) measuring the time intervals between each said transition, said time intervals corresponding to the widths of each mark and space, and (iii) constructing said bit sequences based on said time intervals by establishing a discrimination value for determining whether each of said time intervals corresponds to said short width or said long width.

* * * * *